Inventors
ANDRE J. HENQUET
ODETTE J. SALVADOR
By Robert Harding Jr.
Attorney

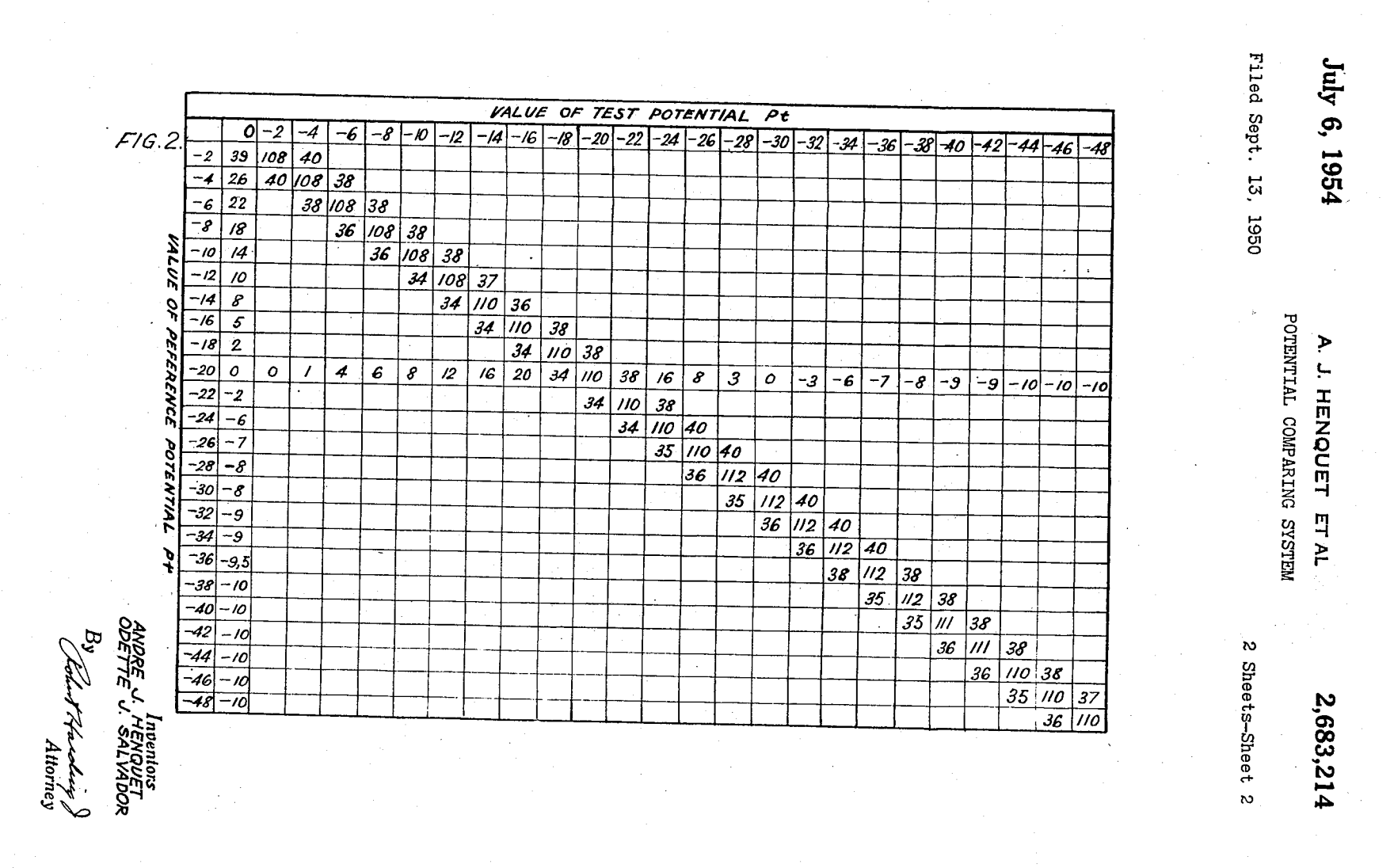

July 6, 1954  A. J. HENQUET ET AL  2,683,214
POTENTIAL COMPARING SYSTEM
Filed Sept. 13, 1950  2 Sheets-Sheet 2

FIG. 2.

Inventors
ANDRE J. HENQUET
ODETTE J. SALVADOR
By Robert Harding
Attorney

Patented July 6, 1954

2,683,214

UNITED STATES PATENT OFFICE 2,683,214

POTENTIAL COMPARING SYSTEM

André Jean Henquet and Odette Julie Salvador, Boulogne-Billancourt, France, assignors to International Standard Electric Corporation, New York, N. Y., a corporation of Delaware Application September 13, 1950, Serial No. 184,984

Claims priority, application France September 23, 1949

7 Claims. (Cl. 250—27)

The present invention relates to improvements in direct current potential comparing devices such as those utilised in automatic telephone central exchanges, for controlling selector-switches.

In U. S. Patent 2,462,074, issued February 22, 1949, to G. Deakin and H. F. Herbig, there have been described D. C. potential comparing devices utilising two triodes and one cold cathode tube. The cathode of one of the triodes is connected to the grid of the other triode and vice-versa. Each of the cathode-grid sets thus defined is connected, on the one hand, to biasing means and on the other hand to a terminal to which is connected the lead carrying one of the discrete potentials to be compared. The anodes of the two triodes are both connected to one end of a resistance the other end of which is connected to the positive terminal of a grounded battery. The anodes are also connected to the control electrode of a cold cathode tube. When the potentials to be compared are equal, the current flowing in said anode resistance is at a certain minimum value and the potential on the control electrode of the cold cathode tube is at a corresponding maximum value approaching the battery potential. The cold cathode tube ionises and may then be utilized, for example, to cause the operation of an electro-magnetic relay the winding of which is connected in the main anode circuit. When, on the other hand, the potentials to be compared are unequal, the current flowing in said anode resistance is greater than said minimum value and the potential on the control electrode of the cold cathode tube (provided the potential difference between the said unequal potentials is great enough) is not sufficiently positive to cause ionization thereof.

It has also been shown, by means of the tables in Figures 5 to 10 of the aforementioned Patent 2,462,074, that in the operation of the comparing device, as the magnitude of one potential successively and by discrete steps approaches, equals and recedes from the magnitude of the reference potential with which it is being compared, a pronounced peak in the potential applied to the control electrode of the cold cathode tube is encountered. For example, with reference to Fig. 6 of the said patent, when the reference potential E2 remains at −4 volts and the potential E3 being compared with it is also −4 volts, the control electrode potential E1 is +123 volts, which latter potential falls to +47 volts or +48 volts when the potential E3 becomes respectively 2 volts more positive or 2 volts more negative than the reference potential. Since a change from +48 volts to +123 volts applied to the control electrode of a suitable type of cold cathode tube affords an adequate practical margin between the non-ionizing and the ionizing conditions of such a tube, the device of the patent may be used successfully to distinguish between equal potentials and potentials differing by as little as 2 volts, when the reference potential is of the order of −4 volts.

However, it has been noticed that as the reference potential varies within the range in which the device is designed to operate, the peak control electrode potential, which occurs when equality is reached, also varies to some extent; moreover, the control electrode potential, which results from a particular potential difference, such as 2 volts, between the potentials being compared, also varies. For example, again with reference to Fig. 6 of Patent 2,462,074, when the reference potential E2 is −42 volts, the peak control electrode potential E1 when potential E3 is also −42 volts is +97 volts, whereas when potential E3 changes to −40 volts or −44 volts, potential E1 falls to +21 volts or +22 volts, respectively. Thus, the requirement imposed upon a cold cathode tube, called upon to operate under either of the two sets of conditions described above, is that it shall not ionize when its control electrode potential is +48 volts and it shall ionize when this potential is raised to +97 volts, rather than +123 volts previously mentioned; and the operating margin of the tube is correspondingly reduced.

It has also been observed that, in the operation of the device described in the aforementioned Patent 2,462,074, the delay network applied between the control electrode and the cathode of the cold cathode tube fails to prevent the intempestive ionization of the tube under certain conditions of transient voltage, particularly such transients as may occur when one of the potentials being compared is changed from one discrete value to another.

The object of the invention is to avoid the above-mentioned disadvantages.

One of the objects of the invention is to provide a potential comparing device such that the combined anode current of the double triode utilized to compare the potentials remains practically constant for a given difference between the reference potential and the potential to be compared whatever the reference potential may be within the range of potentials for which the device is designed.

Another object of the invention resides in providing a potential comparing device the operation of which is stable even for the most negative of the range of reference potentials utilised.

According to one feature of the invention, in a potential comparing device comprising two triodes, there is provided biasing means which apply bias potentials to said triodes bearing a predetermined relation with respect to the reference potential, whereby for given differences between the potentials to be compared, the variation of anode current remains independent of the reference potential.

According to another feature of the invention, the biasing means comprises a transformer having a plurality of windings, one winding being fed with alternating current, second and third identical windings each associated with rectifying means, such as dry rectifiers, adapted to supply a grid bias potential to one of the two triode elements of the comparing device, a fourth winding being traversed by a direct current, one of the terminals of said fourth winding being connected to the comparing device terminal which is brought to the reference potential, and the other terminal being connected to a current source having a constant potential, whereby the said grid bias potentials bear a predetermined relation with respect to the potential difference between said reference potential and said constant potential.

According to another feature of the invention, there is provided means adapted to bring the terminals of the comparing device to different potentials which are outside the range within which the comparing device operates, when its terminals are not connected to any source of potential.

According to another feature of the invention, a circuit causing a certain delay in the transmission of electric variations is connected between the anode circuit common to both triodes and the control electrode of the cold cathode tube so as to avoid the operation of the comparing device due to incidental transient variations of the potentials to be compared.

According to another feature of the invention there is connected between one point of the circuit connecting the anodes of the two triodes to the control electrode of the cold cathode tube and the ground of the device, a dry rectifier arranged so that it is conductive for current when the electrode potential of said cold cathode tube is negative with respect to ground.

The invention will be best understood from the following description of an embodiment, said description being made in connection with the annexed drawings in which:

Fig. 2 represents a table giving certain of the results obtained with the device shown in Fig. 1.

Figure 1:
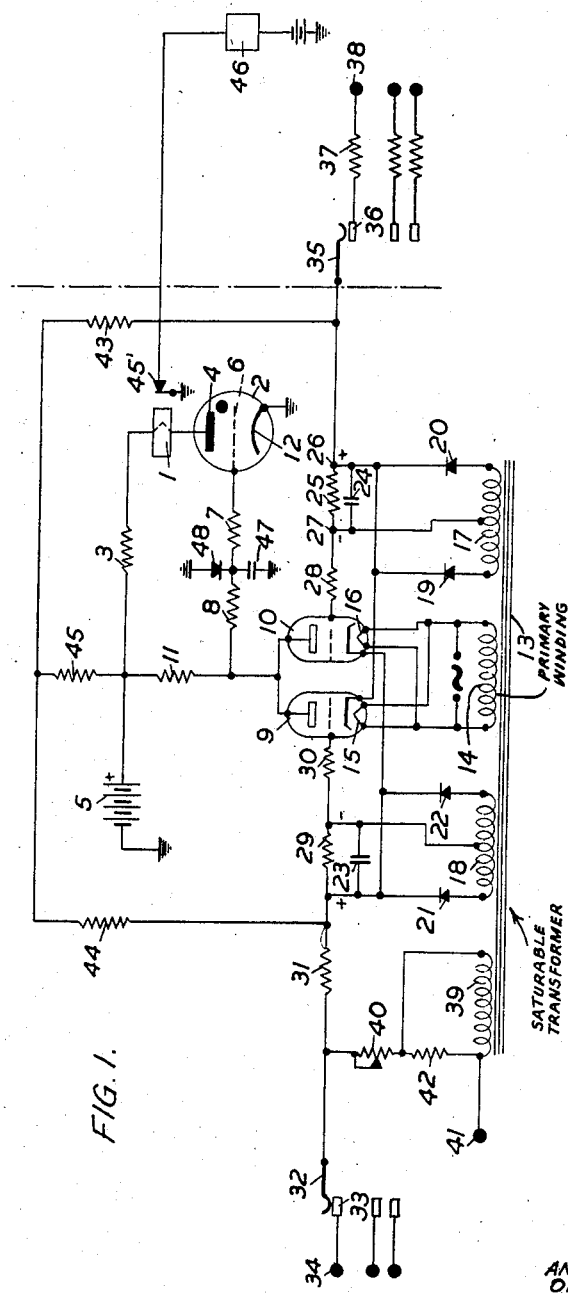
Fig. 1 represents a diagrammatic circuit of a potential comparing device embodying features of the invention.

Considering Fig. 1, there will be seen at 1 an electro-magnetic relay the energisation of which is controlled by the ionization of a cold cathode tube 2. The winding of relay 1 is connected in series with resistance 3 between the anode 4 of cold cathode tube 2 and the positive terminal of a grounded battery 5. The control electrode 6 of cold cathode tube 2 is connected through resistances 7 and 8 to the anodes of two triodes 9 and 10 and to the positive terminal of battery 5 through resistance 11. When either or both of the triodes 9 and 10 are conductive, a current flows through resistance 11 lowering the potential of the end of resistance 11 connected to the anodes of triodes 9 and 10. The control electrode 6 of cold cathode tube 2 is brought to a potential insufficient to cause ionisation of said cold cathode tube. When the triodes are both blocked, no current flows in resistance 11 and the control electrode 6 is brought to the potential of battery 5, the cold cathode tube ionises, and a current flows between cathode 12 and anode 4. Relay 1 traversed by the anode current of cold cathode tube 2 energises.

The terminals of primary winding 14 of transformer 13 are connected to a source of alternating current. In the embodiment, the alternating current used is the 6.3 volt current also used for heating filaments 15 and 16 of triodes 9 and 10. The two ends of winding 17 are connected through rectifiers 19 and 20 to one end 26 of a resistance 25 the other end 27 of which is connected to the middle point of winding 17; rectifiers 19 and 20 are connected so that the end 26 of resistance 25 will be positive with respect to the end 27 of said resistance. End 27 of resistance 25 is connected through resistance 28 to the grid of triode 10 and the end 26 of resistance 25 is connected to the cathode of triode 9. Condenser 24 filters the current flowing over resistance 25. The biasing of the cathode of triode 10 and of the grid of triode 9 is obtained by means of elements 18, 21, 22, 23, 29 and 30 which fulfil the same function as elements 17, 19, 20, 24, 25 and 28 respectively, and are so dimensioned that the voltage drops across resistances 25 and 29 are equal.

The grid of triode 9 is connected by means of resistances 30, 29 and 31, placed in series to brush 32 which moves over terminals such as 33. Each terminal 33 is connected to a terminal such as 34 brought to a potential Pr which will be designated in the course of the description as "reference potential." The grid of triode 10 is connected by means of resistances 28 and 25 to brush 35 which moves over terminals such as 36. Each terminal 36 is connected by means of a resistance such as 37 to a terminal 38 brought to a potential Pt which will be designated in the course of the description as "test potential." Transformer 13 is moreover provided with winding 39 one end of which is connected to brush 32 through variable resistance 40, and the other end of which is connected to a terminal 41 brought to a potential which is negative with respect to the most negative potential amongst the potentials to be compared. A resistance 42 connected to terminals of winding 39 reduces the self-induction effect due to this winding.

In order that the grid of tube 10 and the cathode of tube 9 shall not "float" when brush 35 is not connected to any source of potential, as for example when it is standing between two terminals 36, the cathode of tube 9 is connected through a stabilizing resistance 43, and the cathode of tube 10 through a resistance 44, to one end of a resistance 45, the other end of which is connected to the positive terminal of battery 5. The resistance values of said resistances 43 and 44 are equal and high in comparison with those of resistances 37 and 31, respectively, so that these connections do not materially affect the normal operation of the comparing device. It will be noted that the negative potential connected to terminal 41, which is effectively applied to the cathode of tube 10 when brush 32 is not connected to any source of potential, and the positive potential of battery 5, which is applied to the cathode of tube 9 when brush 35 is not connected to any source of potential, are both outside the range of the potentials which the device is designed to compare; and that in the above circumstances, whether occurring separately or together, tube 10 conducts and the voltage drop in resistance 11 prevents the intempestive ionization of the cold cathode tube 2.

When brush 32 is connected to a terminal such as 33 brought to a reference potential Pr, a current flows through winding 39 of transformer 13 due to the fact that terminal 41 is brought to a potential which is negative with respect to potential Pr. When reference potential Pr is changed by advancing brush 32 over terminals, such as 33, having different potentials, the current flowing in winding 39 changes also. The permeability of the magnetic circuit of transformer 13 varies in consequence, thus modifying the potential difference across the terminals of windings 17 and 18. The characteristics of transformer 13 and the potential applied to terminal 41 have been chosen so that, for each discrete difference between the test potential Pt and the reference potential Pr, the variation in the anode current of the two triodes 9 and 10 is relatively small. The variable resistance 40 permits the adjustment of the current flowing in 39 so that the anode current variations of the two triodes are within predetermined limits. In a preferred embodiment use has been made of a double triode of 6SL7 type and a cold cathode tube of type 3313 CA. The table represented on Fig. 2 gives the result of trials effected with a comparing device adapted to compare potentials between 0 and −48 volts. The positive terminal potential of battery 5 is +140 volts. In the table of Fig. 2 there have been represented along the abscissa the values of test potential Pt and along the ordinate the values of reference potential Pr, the values of the resulting potential of control electrode 6 of cold cathode tube 2 being represented facing the corresponding test and reference potentials. It is to be noted that for equal test and reference potentials the potential applied to control electrode 6 of cold cathode tube 2 is always approximately 110 volts whereas for a 2 volt difference in absolute value between the test potential and the reference potential, the control electrode potential is always approximately 40 volts. The necessary minimum potential of the control electrode of the selected type of cold cathode tube 2 is considered as being about 70 volts; thus, if the test and reference potentials are arranged to vary in discrete steps of not less than 2 volts, the tube is capable of distinguishing between equal and unequal potentials with a substantial margin of security.

At 45' is represented a break contact of relay 1 which controls the energisation circuit of clutch electromagnet 46 of a selector-switch such as those utilised in automatic telephone exchanges. It is to be understood that when magnet 46 is energized brush 35 of said selector advances over bank terminals such as 36.

Condenser 47 and resistances 8 and 11 constitute a circuit having a certain time constant. In the preferred embodiment, the condenser has a 0.001 microfarad capacitance. In case a transient voltage appears in the anode circuit, for example as a result of the potential variation of the test brush 35 during its movement, the circuit constituted by condenser 47 and resistances 8 and 11 prevents the intempestive ionization of the cold cathode tube.

A rectifier 48 is connected between the common point of resistances 7 and 8 and ground, so oriented that said rectifier passes current when the common point of resistances 7 and 8 is negative with respect to ground. It is known that a current may be established between the anode and the control electrode of the cold cathode tube when the potential difference between these two electrodes is more than a preferred value, 180 volts in the given embodiment; in these conditions the rectifier shunts the control gap and prevents the intempestive ionisation of the tube.

While the present invention has been described in connection with one embodiment, it is clear that it is not limited to said embodiment and that on the contrary the invention is capable of numerous modifications and variations.

We claim:

1. A device for comparing discrete D. C. potentials, comprising a pair of thermionic tubes each having an anode, a cathode, and a control grid, means for interconnecting the grid of each tube and the cathode of the other, a plurality of sources of discrete steady reference potentials, means for selectively applying the reference potential from one of said sources to one of said cathodes, a plurality of sources of discrete steady test potentials, means for applying the test potentials from said sources in sequence to the other of said cathodes, a source of steady anode supply potential, common means for connecting said source of anode supply potential to both of said anodes, a transformer having a primary winding, a control winding and a pair of secondary windings, a source of alternating current, means for connecting said alternating current source to said primary winding, rectifier means for developing a D. C. biasing potential from each of said secondary windings, means for impressing one of said biasing potentials between each of said interconnected grids and cathodes, and means for applying across said control winding a steady voltage directly dependent upon said selected reference potential, whereby the anode current in said common means resulting from discrete combinations of reference and test potentials applied to said cathodes which have the same potential difference is substantially constant irrespective of the reference potential selected.

2. A potential comparing device according to claim 1, in which said steady-voltage applying means comprises a further source of steady potential connected to one end of said control winding and a connection between the other end of said control winding and said one of said cathodes.

3. A potential comparing device according to claim 2, in which said last-mentioned connection includes means for adjusting the current flowing in said control winding.

4. A potential comparing device according to claim 2, in which the means for developing said biasing potential from one of said secondary windings comprises a resistor having one end connected to the mid-point of said secondary winding, a rectifier connected between the other end of said resistor and one end of said secondary winding and a second rectifier connected between said other end of said resistor and the other end of said secondary winding.

5. A potential comparing device according to claim 4, in which said other end of said resistor is connected to the cathode of one of said tubes and said one end of said resistor is connected to the grid of the other said tube, whereby the biasing potential developed from said secondary winding is impressed between said cathode and said grid.

6. A potential comparing device according to claim 1, in which means is provided to apply to said other of said cathodes a potential, which is more positive than the potential of any of said sources of reference potentials, when said last-mentioned cathode is not connected to any of said sources of test potentials, whereby the tube associated with said cathode, is rendered non-conducting and the other of said tubes is rendered conducting.

7. A potential comparing device according to claim 6, in which said last-mentioned means comprises a resistor connected between said last-mentioned cathode and said source of anode supply potential.

References Cited in the file of this patent

UNITED STATES PATENTS

| Number | Name | Date |
| --- | --- | --- |
| 2,211,750 | Humby | Aug. 10, 1940 |
| 2,231,670 | Heller | Feb. 11, 1941 |
| 2,297,836 | Leby | Oct. 6, 1942 |
| 2,428,604 | Augier | Oct. 7, 1947 |
| 2,559,601 | Deakin | July 10, 1951 |
| 2,649,557 | Ransom | Aug. 18, 1953 |